United States Patent [19]

Hilliker

[11] 4,267,468
[45] May 12, 1981

[54] TEMPERATURE SENSING CIRCUIT

[75] Inventor: Stephen E. Hilliker, Chandler, Ariz.

[73] Assignee: Motorola, Inc., Schaumburg, Ill.

[21] Appl. No.: 32,031

[22] Filed: Apr. 23, 1979

[51] Int. Cl.³ .............................................. H03K 3/26
[52] U.S. Cl. ................................... 307/310; 307/254; 307/580; 328/3
[58] Field of Search ....................... 307/310; 328/1, 3; 340/882; 323/75 H, 75 K; 73/262 AR

[56] References Cited

U.S. PATENT DOCUMENTS 3,933,046  1/1976  Ebrecht .............................. 323/75 K

FOREIGN PATENT DOCUMENTS 2246040  9/1971  Fed. Rep. of Germany ........ 323/75 K Primary Examiner—Stanley D. Miller, Jr.
Assistant Examiner—B. P. Davis
Attorney, Agent, or Firm—Paul F. Wille

[57] ABSTRACT

An improved temperature sensing circuit as disclosed in which the voltage drop across a thermistor is compared to the voltage drop across a capacitor to produce a linear output proportional to temperature.

5 Claims, 2 Drawing Figures

TEMPERATURE SENSING CIRCUIT

This invention relates to temperature sensing circuits using a non-linear temperature dependent resistance and, in particular, to a circuit for converting the non-linear response of the resistor to a linear output.

Many temperature sensing circuits using a resistance as the sense element have, unless corrected, a non-linear output; specifically, the output is exponentially related to temperature by an exponential of base e (2.7183). By limiting the range over which temperature is sensed, e.g. a range of 50° C., and by proper choice of resistor characteristics, the output can be made to seem linear by choosing a portion of the response curve where the error is within acceptable limits. Alternatively, prior art temperature sensors have incorporated various analogue and/or digital techniques to obtain a linear output. For example, the temperature sensing element has been incorporated in a complex series-parallel resistor network to reduce the effect of the non-linear response. A problem with this approach is that it also reduces the apparent change in resistance. Another problem is that the network requires voltage regulation so that voltage drifts are not interpreted as temperature changes.

To counteract supply voltage problems, Wheatstone bridge circuits have been used wherein one arm of the bridge comprises the temperature sensor. This alone does not alleviate the problem of the non-linear variation of resistance with temperature. Further, the non-linearity becomes more serious the greater the temperature range involved.

While quite accurate laboratory grade temperature sensors are available with features such as automatic range changing, the need exists for a low cost, single range temperature sensing circuit capable of covering a wide temperature range, e.g., 0°–400° C. with reasonable accuracy, e.g. ±5°. This need arises in such applications as ovens, or other appliances, and automobiles. In such aplications, cost is of great importance, to the extent of limiting the number of components that can be used. In addition, almost any current application requires that the temperature sensing circuit be compatible with a computer.

In view of the foregoing, it is therefore an object of the present invention to provide an improved temperature sensing circuit.

Another object of the invention is to provide a temperature sensing circuit in which the output is linearly proportional to temperature.

A further object of the present invention is to provide a temperature sensing circuit that is compatible with digital circuitry.

Another object of the present invention is to provide a temperature sensing circuit using a single resistive temperature sensing element to cover a wider temperature range than has been provided heretofore.

A further object of the present invention is to provide a temperature sensing circuit having a wider range at the same accuracy of the prior art or the same range at improved accuracy.

The foregoing objects are achieved in the present invention wherein the voltage drop across the temperature sensing resistance is compared to the voltage on a discharging capacitor to produce an output signal having a period proportional to temperature. The relationship of period to temperature can be made linear since the capacitor discharges at a rate which can also be expressed as an exponential of the base e.

A more complete understanding of the present invention can be obtained by considering the following detailed description in conjunction with the accompanying drawings, in which.

DETAILED DESCRIPTION OF THE INVENTION

Figure 1:
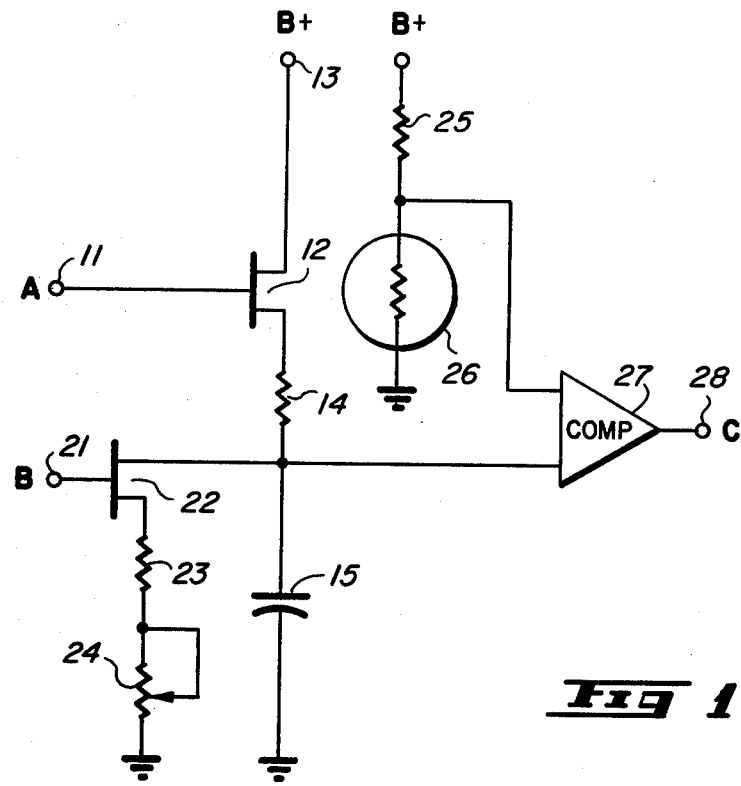
FIG. 1 illustrates a preferred embodiment of a temperature sensing circuit in accordance with the present invention.

FIG. 1 illustrates a preferred embodiment of the present invention in which the comparison of voltages across two non-linear elements provides a linear output proportional to the temperature of one of the elements. Specifically, the temperature sensing circuit in accordance with the present invention comprises a first input terminal 11 connected to a switch element 12, illustrated in FIG. 1 as comprising a field effect transistor (FET). Switch 12 is connected in a series circuit between a source of supply voltage 13 and ground, the series circuit comprising switch 12, resistor 14, and capacitor 15. Connected in parallel with capacitor 15 is a second switch element 22, also illustrated as a FET, in series with fixed resistor 23 and variable resistor 24. The gate or control electrode of switch 22 comprises a second input 21 to the temperature sensing circuit. Also connected between a source of supply voltage and ground is a third series circuit comprising resistor 25 and temperature sensing resistance 26.

As can be seen by inspection of FIG. 1, a bridge circuit is thus formed wherein a first arm comprises switch 12 and resistor 14, a second arm comprises capacitor 15, a third arm comprises resistor 25, and the fourth arm comprises temperature sensing element 26. The supply voltage is connected across a first diagonal of the bridge, and the second diagonal of the bridge is connected as the inputs to comparator 27. Voltage comparator 27 compares the voltages across capacitor 15 and temperature sensing element 26 and provides an output signal at output terminal 28 indicative of which of the input signals is the higher voltage. Suitable integrated circuit voltage comparators or operational amplifiers are well known per se in the art.

Figure 2:
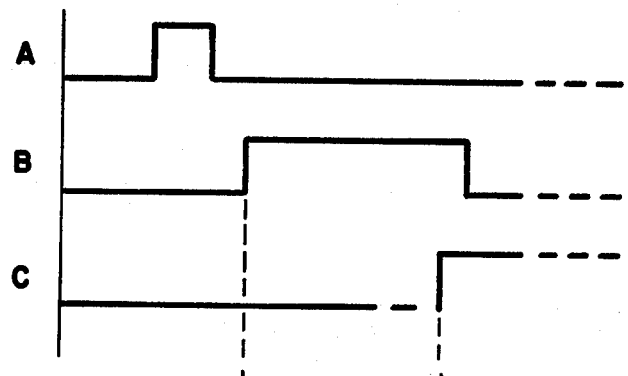
FIG. 2 illustrates waveforms useful in understanding the operation of the circuit in FIG. 1.

A more complete understanding of the operation of the circuit illustrated in FIG. 1 can be obtained by considering the waveforms illustrated in FIG. 2. Specifically, capacitor 15 is initially charged to approximately the supply voltage. This is accomplished by turning on switch 12, thereby connecting capacitor 15 to the supply voltage by way of resistor 14. The duration of the pulse at input 11 is sufficient to allow capacitor 15 to charge to approximately the supply voltage. After the termination of the pulse applied at input 11 temperature is sensed by applying a pulse at input 21, turning on switch 22. All during this time, voltage comparator 27 is providing an output signal at terminal 28 indicative of the fact that the voltage on capacitor 15 is higher than the voltage across temperature sensing element 26. As an initial condition, it is assumed that this output is a low voltage. The duration of the pulse applied at input 22 is sufficient to ensure the discharge of capacitor 15 to a voltage less than the voltage drop across temperature sensor 26 is likely to attain. At some point during the discharge of capacitor 15 the voltage drop thereacross will be less than the voltage drop across temperature sensing element 26. At this point, indicated as $t_1$ in FIG. 2, the output from voltage comparator 27 changes state. Since the voltage drops across capacitor 15 and temperature sensing element 26 are both powers of the constant e, the period defined by the leading edge of the pulse at input 21 and the output pulse from comparator 27 is linearly proportional to the temperature of sensing element 26.

There is thus provided by the present invention an improved temperature sensing circuit in which relatively few devices provide an output linearly proportional to temperature. The circuitry of the present invention can be used for determining temperature within ±5° over a 400° C. temperature range. In addition, the circuit is compatible with digital or computer circuitry in which the duration of the output pulse from comparator 26 is readily converted to a number e.g., by simply counting pulses during the period $t_0-t_1$. In addition, the temperature measurement is relatively immune to power supply variations since a comparison bridge is utilized.

Having thus described a preferred embodiment, it will be apparent to those of skill in the art that various modifications can be made within the spirit and scope of the present invention. For example, while described in conjunction with capacitor 15 being initially charged and then discharged for the comparison, the converse sequence may also be utilized. If so desired, the pulse applied to input 21 may be terminated by suitable circuitry sensing the output pulse from the comparator 27 thereby increasing the rate at which temperature readings may be made, at the cost of additional circuitry. While illustrated in FIG. 2 as positive going pulses, the various pulse levels may be inverted as necessary or desired to interface with peripheral circuitry. This peripheral circuitry may, for example, include a microcomputer, specifically a microprocessor. As such, inputs 11 and 21 are connected to respective bits of an output port while output 28 is connected to an interrupt request line. The circuit operates as described above and suitable software is provided as the interrupt service routine for obtaining a count, from an internal timer, proportional to the time period $t_0-t_1$. A suitable microprocessor chip for this purpose is the MC6801 microcomputer as sold by Motorola, Inc. The service routine may, in turn, be interrupted and switch 22 opened; i.e. the discharge and counting need not be continuous, assuming low or offsetting leakages on the part of switches 12 and 22 in the high impedance state.

I claim:

1. In an electrical circuit for producing an output signal proportional to temperature and having four arms connected in a bridge configuration wherein a first arm comprises a non-linear temperature sensing element, a source of voltage is connected across one diagonal of said bridge, and a comparison means is connected across the other diagonal, the improvement comprising:
   a second arm, not in series with said first arm, comprising capacitor means;
   switch means in a third arm, in series with said second arm, for selectively charging said capacitor; and
   said comparison means comprises voltage comparison means for producing an output signal indicative of the temperature of said sensing element.

2. The circuit as set forth in claim 2 wherein said second arm further comprises discharge means connected in parallel with said capacitor means.

3. The circuit as set forth in claim 2 wherein said discharge means is variable whereby said circuit can be calibrated.

4. The circuit as set forth in claim 2 wherein said discharge means comprises switch means for selectively discharging said capacitor.

5. The circuit as set forth in claim 4 wherein said switch means intermittently discharges said capacitor.

* * * * *

UNITED STATES PATENT AND TRADEMARK OFFICE
CERTIFICATE OF CORRECTION

PATENT NO. : 4,267,468
DATED : May 12, 1981
INVENTOR(S) : Stephen E. Hilliker

It is certified that error appears in the above-identified patent and that said Letters Patent are hereby corrected as shown below:

Column 4, line 28, change "2" (second occurrence) to --1--.

Signed and Sealed this

Twenty-first Day of July 1981

[SEAL]

*Attest:*

GERALD J. MOSSINGHOFF

*Attesting Officer*  *Commissioner of Patents and Trademarks*